UNITED STATES PATENT OFFICE.

WILLIAM VIRGO WILSON, OF LONDON, ENGLAND.

MANUFACTURE OF WHITE LEAD.

SPECIFICATION forming part of Letters Patent No. 303,779, dated August 19, 1884.

Application filed June 11, 1883. (No specimens.) Patented in England September 8, 1882, No. 4,275.

*To all whom it may concern:*

Be it known that I, WILLIAM V. WILSON, of London, England, have invented a new and useful Improvement in the Manufacture of White Lead; and I do hereby declare that the following is a full and exact description thereof, the apparatus, as described, being made the subject-matter of a separate application to be filed herewith.

My invention relates to the manufacture of white lead, especially for use as a pigment, by producing in a pure carbonate of lead a large proportion of hydrated oxide of lead by means of an alkali.

In an English patent to H. L. Pattinson, No. 9,102 of 1841, a process is described for manufacturing so-called "white lead" by precipitating carbonate of lead from any of the soluble salts of lead by means of carbonate of magnesia obtained from magnesian limestone, and the carbonate of lead so obtained is purified of the chloride of lead which it contains by treating it with a caustic alkali. The use of the caustic alkali in this process is limited to the removal of the chloride from the carbonate, and the result is simply a pure carbonate.

The object of my invention is to obtain at a reduced cost, by means of an alkali, what may be designated as an "impure carbonate of lead," or, in other words, a carbonate of lead containing such a proportion of hydrated oxide of lead as will produce in perfection and with a superior body or covering property the pigment commercially known as "white lead," and for this purpose I may take the pure carbonate of lead which has been obtained in pursuance of the process described in Pattinson's patent as above, or the carbonate of lead obtained by an admixture of any carbonate or bicarbonate with the salts and sub-salts of lead, as set forth in the English Patent No. 11,114 of 1870, or the carbonate of lead obtained from metallic lead by means of its exposure alternately to a solution of neutral acetate of lead and to the atmospheric air at a somewhat elevated temperature, and thereafter to carbonic acid, or, in brief, pure carbonate of lead however obtained.

My invention consists in converting the carbonate of lead obtained by any of the customary processes known in the art, but more especially that which has been produced by the precipitation of carbonate of lead from its salts through the agency of carbonic-acid gas by treating the carbonate with about seven (7) per cent. of caustic potash or its equivalent, the carbonate being considered as in the dry state in calculating this proportion.

As an equivalent for the caustic potash, I may use soda, ammonia, or the causticized alkaline earths, although I do not advise the use of the latter generally on account of their forming insoluble precipitates.

My treatment of the carbonate of lead with the alkali is effected either by passing a solution of caustic potash or of one or more of the equivalent chemical bodies above mentioned through the filter-press in which the precipitated carbonate of lead is collected, or into a closed or open vessel in which the carbonate of lead has been deposited, and either with or without the application of heat.

I do not claim the use of caustic alkali in the purification of carbonate of lead by the removal therefrom of chloride of lead.

What I claim as my invention, and desire to secure by Letters Patent, is—

The improvement in the art of manufacturing white lead which consists in the production of hydrated oxide of lead in a carbonate of lead by treating the latter with caustic potash, in substantially the proportions and manner herein set forth.

In testimony whereof I have signed my name to this specification in the presence of two subscribing witnesses.

WILLIAM VIRGO WILSON.

Witnesses:
E. G. WEIGHTMAN,
W. T. ATKIN.